United States Patent
Madau et al.

(10) Patent No.: US 6,314,329 B1
(45) Date of Patent: Nov. 6, 2001

(54) COMPENSATION ALGORITHM FOR INITIALIZING YAW RATE SENSOR'S ZERO POINT OFFSET

(75) Inventors: Dinu Petre Madau; Behrouz Ashrafi, both of Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/188,050

(22) Filed: Nov. 6, 1998

(51) Int. Cl.[7] .................................................. G05B 19/42
(52) U.S. Cl. .............................. 700/89; 700/67; 700/68; 700/69; 700/74; 701/5; 701/37; 701/38; 701/70; 702/85; 702/104
(58) Field of Search ................................. 700/89, 67, 68, 700/69, 70, 71, 73, 74; 701/1, 5, 37, 38, 39, 70, 72; 702/85, 94–96, 104, 142

(56) References Cited

U.S. PATENT DOCUMENTS

| | | | |
|---|---|---|---|
| 4,927,170 | * 5/1990 | Wada | 280/707 |
| 5,123,497 | * 6/1992 | Yopp et al. | 180/142 |
| 5,225,753 | * 7/1993 | Koike et al. | 318/560 |
| 5,274,576 | 12/1993 | Williams | 364/565 |
| 5,285,390 | * 2/1994 | Haseda et al. | 700/67 |
| 5,311,431 | * 5/1994 | Cao et al. | 700/67 |
| 5,347,458 | * 9/1994 | Serizawa et al. | 700/69 |
| 5,448,481 | 9/1995 | Asanuma et al. | 364/424.05 |
| 5,608,631 | * 3/1997 | Tsutsumi et al. | 700/67 |
| 5,642,281 | 6/1997 | Ishida et al. | 364/424.051 |
| 5,719,790 | 2/1998 | Lohrenz et al. | 364/571.03 |
| 5,742,918 | 4/1998 | Ashrafi et al. | 701/70 |
| 5,742,919 | 4/1998 | Ashrafi et al. | 701/70 |
| 5,809,434 | 9/1998 | Ashrafi et al. | 701/1 |
| 5,815,825 | * 9/1998 | Tachibana et al. | 701/23 |
| 5,857,160 | * 1/1999 | Dickinson et al. | 701/41 |

FOREIGN PATENT DOCUMENTS

| | | | |
|---|---|---|---|
| 406087460 | 3/1904 | (JP) | B62D/6/00 |
| 402204177 | 8/1990 | (JP) | B62D/7/14 |
| 404012216 | 1/1992 | (JP) | G01B/21/22 |
| 404062419 | 2/1992 | (JP) | G01C/21/00 |
| 404076462 | 3/1992 | (JP) | G01P/15/00 |
| 404135976 | 5/1992 | (JP) | B62D/6/00 |
| 404306177 | 10/1992 | (JP) | B62D/15/02 |
| 405143397 | 11/1993 | (JP) | G08G/1/0968 |
| 406160415 | 6/1994 | (JP) | G01P/15/00 |
| 406273443 | 9/1994 | (JP) | G01P/15/14 |
| 407172333 | 7/1995 | (JP) | B62D/6/00 |
| 409049875 | 2/1997 | (JP) | G01S/13/60 |

* cited by examiner

Primary Examiner—William Grant
Assistant Examiner—Ramesh Patel
(74) Attorney, Agent, or Firm—John E. Kajander

(57) ABSTRACT

When a motor vehicle is not in motion, an algorithm for establishing the initial zero point offset values for a yaw rate sensor as may be used in motor vehicle software control systems. The initial values are the manufactured values and are downloaded into the vehicle ECU at the time of the manufacture of the ECU. When the vehicle is waken at the vehicle assembly and the ignition is first turned on, the initial actual value of the zero point offset is stored both as a maximum and minimum value. At subsequent adjusting times when the vehicle is not moving, but the ignition is on, the spread between the maximum and minimum values are checked. If the spread becomes greater than a desired predetermined spread, the value, be it the maximum or minimum value reflects the measured value and the other value is adjusted to be within the desired spread. When the ignition is turned off and the vehicle is not moving, the zero point offset maximum and minimum values are stored in memory. The mean value is calculated to provide the new zero point offset value of the yaw rate sensor when the vehicle ignition is then turned on and the vehicle is not moving.

6 Claims, 3 Drawing Sheets

COMPENSATION ALGORITHM FOR INITIALIZING YAW RATE SENSOR'S ZERO POINT OFFSET

BACKGROUND OF THE INVENTION

1. Field of the Invention

This invention relates to solid state sensors as used in motor vehicle control and more particularly a method for fingerprinting a yaw rate sensor according to environmental conditions.

2. Prior Art

U.S. Pat. No. 5,809,434 entitled Method and Apparatus for Dynamically Determining an Operating State of a Motor Vehicle issued Sep. 15, 1998 by Ashrafi et al. and assigned to a common assignee, relates to a method for determining the D.C. offset or sensor drift of a yaw rate of a motor vehicle when the vehicle is moving.

U.S. Pat. No. 5,742,918 entitled Method and Apparatus for Dynamically Compensating a Lateral Acceleration of a Motor Vehicle issued Apr. 21, 1998 by Ashrafi et al. and assigned to a common assignee, relates to a method for determining the D.C. offset or sensor drift of lateral acceleration of a motor vehicle.

U.S. Pat. No. 5,742,919 entitled Method and Apparatus for Dynamically Determining a Lateral Velocity of a Motor Vehicle issued Apr. 21, 1998 by Ashrafi et al. and assigned to a common assignee, relates to a method for dynamically estimating a lateral velocity of a motor vehicle.

All of the above patents are incorporated herein by reference as they all relate to motor vehicle control systems wherein sensors, as described herein, are used.

SUMMARY OF THE INVENTION

There is described and disclosed a method and algorithm for determining the offset value of an electronic sensor such as used in a motor vehicle control system while the vehicle is moving. The method has the steps of initially storing in a memory default maximum and minimum offset values of the sensor as determined at time of manufacture. The electronic control unit calculates the average of the two stored values to derive an offset value for the sensor representing the predetermined known beginning zero offset point of the sensor.

The ignition is turned on and the vehicle is not moving, an initializing signal, applying power to the sensor. After a predetermined time period, ΔT, after the power is applied, the sensor output is measured to establish a reference level of the sensor. The measured value is then compared with both the stored maximum and minimum offset values of the sensor. If there is a difference, the difference is determined and if the measured value is greater (in a positive sense) or less than (in a negative sense) one of the stored values, the stored value is replaced. The electronic control unit then recalculates the average of the two stored values to derive a new offset value for the sensor.

DETAILED DESCRIPTION OF THE PREFERRED EMBODIMENT

Figure 1:
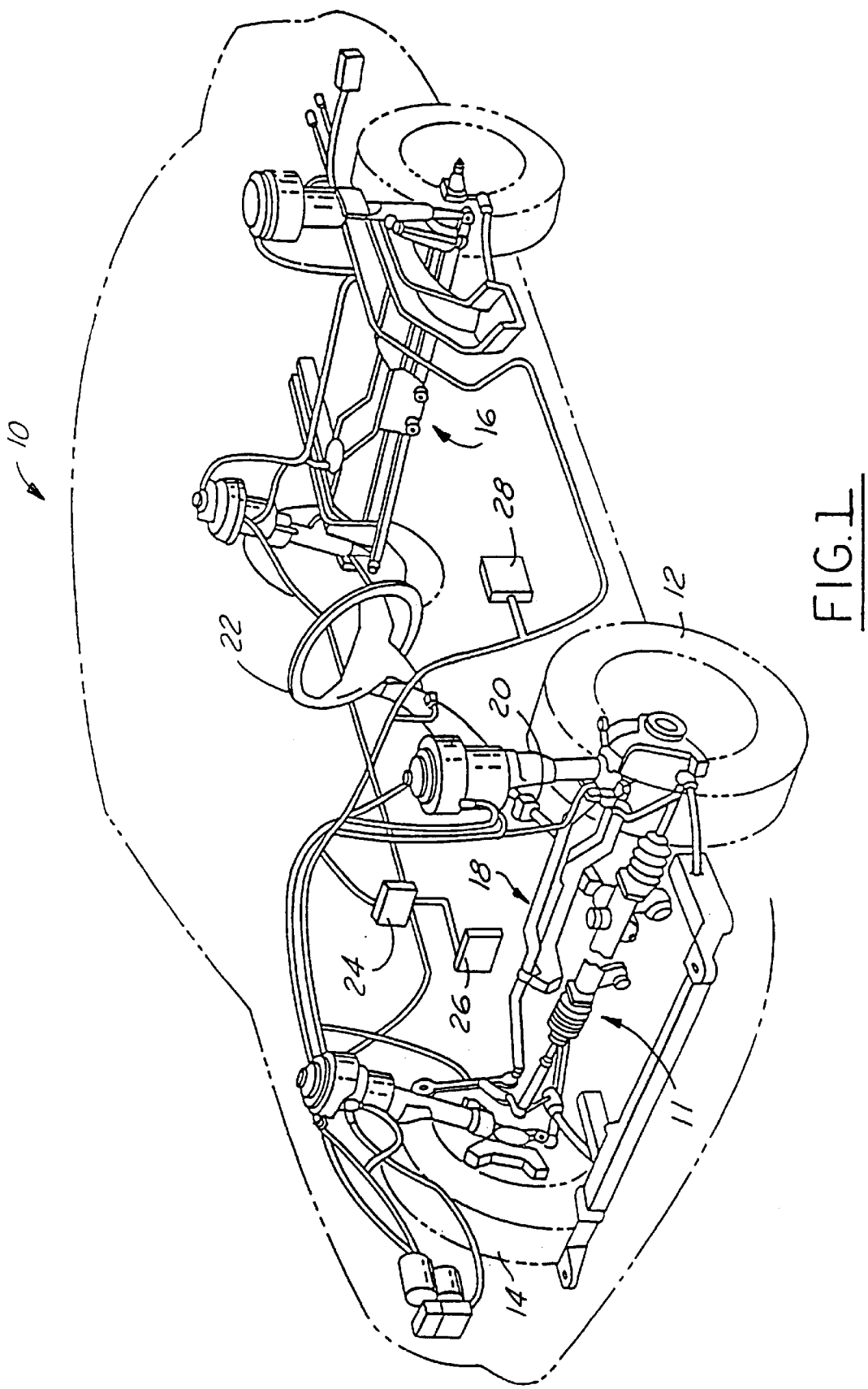
FIG. 1 is a perspective view of a motor vehicle.

Referring to the FIGS. by the characters of reference there is illustrated in FIG. 1 a perspective view of a motor vehicle 10. In the view there is illustrated a front axle 11 having a pair of front wheels 12, 14, one at each end respectively and a rear axle 16 spaced from the front axle 11. The distance between the two axles 11, 16 is defined as the wheelbase of the vehicle and is typically measured in meters. Operatively connected to the front axle 11 is a steering wheel mechanism 18 for causing the vehicle front wheels 12, 14 to turn clockwise or counterclockwise under control of a vehicle operator. A steering sensor 20 interposed the steering wheel 22 and the front axle 11 and is operatively connected to the steering wheel 22. Located in the vehicle are an electronic control unit 24, ECU, four wheelspeed sensors 26 (only one shown), one at each wheel, from which is calculated the velocity and acceleration of the vehicle, and a yaw rate sensor 28.

In many control systems in a motor vehicle, it is necessary to determine the beginning point of the several sensors prior to the supplying of data from the sensor or sensors to the electronic control unit 24, ECU. In the present embodiment, one particular sensor to be initialized at the beginning of a vehicle operation is the yaw rate sensor 28. The output of the yaw rate sensor 28 is a voltage signal proportional to the yaw of the vehicle in degrees per second, °/sec.

The specifications for a yaw rate sensor 28 state both the total zero point offset drift and total zero point offset drift due to temperature. In particular, the total zero point-offset drift due to temperature is less than the total zero point offset drift. Temperature and EMI are the main components of offset drift for rapid zero point-offset drift. Other components of zero point offset drift have only long term effects and are contained in the total zero point offset drift specification.

Figure 4:
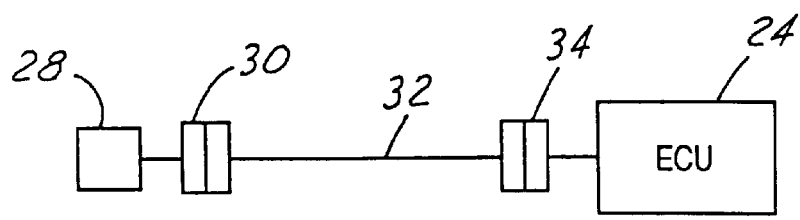
FIG. 4 is a schematic of the tolerance stackup between the sensor and the electronic control unit.

Total zero point offset drift is a summation of the total zero point offset drift due to temperature and the total offset drift due to other factors. Referring to FIG. 4 there is illustrated the several areas wherein the voltage tolerance build-up for the sensor system can occur. The sensor 28 has a defined tolerance. The sensor 28 is connected to a connector 30 that is typically located near the sensor. The connector 30 has a plurality of wires 32 to carry the output voltage signal of the sensor 28 to at least one other connector 34 that is connected to microprocessor having a memory, not shown, in the ECU 24. The total tolerance build up is equal to the summation of the tolerance of each element in the system.

Figure 2:
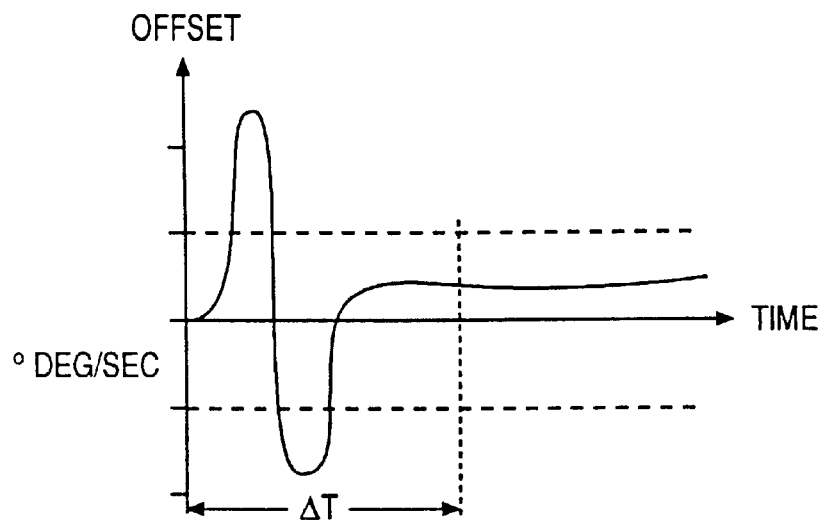
FIG. 2 is a waveshape diagram showing possible voltage swings prior to the lapse of a predetermined period of time after the initializing signal.

Referring to FIG. 2 there is illustrated in graphic form, the checking of the sensor 28 a predetermined time, ΔT, after a given event. In particular, the given event is the turning on of the ignition. At a time ΔT after the ignition is turned on and the vehicle is not moving, the offset value of the sensor is checked. In this particular embodiment, the vehicle is not moving, velocity equals zero. A vehicle is determined not to be moving when the following are present: (i) the driver is applying brake pressure; (ii) the vehicle's anti-lock brake system indicates that the velocity is zero: and (iii) there is no lateral acceleration. The voltage from sensor 28 is sampled by the ECU 24, filtered and stored as the initial zero point offset value in the ECU.

Initially, during the manufacture of the ECU default values for both the maximum and minimum zero point-offset values are downloaded into the ECU memory. In particular, the downloaded values are way out of range in order to have the ECU updated when the assembled vehicle is "waken up". The ECU and the sensor are installed in the vehicle at the time of vehicle assembly. The vehicle is initially started by turning on the ignition and the initial updated zero point offset values due to temperature are entered into a non-volatile memory as a digital representation of a voltage signal. The same value is stored for both maximum and minimum values. In digital systems, it is well known to represent values by means of numbers. The range of zero to five volts can be represented digitally as one thousand twenty four counts. In particular the value of zero volts may be five hundred twelve counts and plus/minus twenty-six counts may equal ±1° degree/second. Such values are under the control of the system designers.

Figure 3:
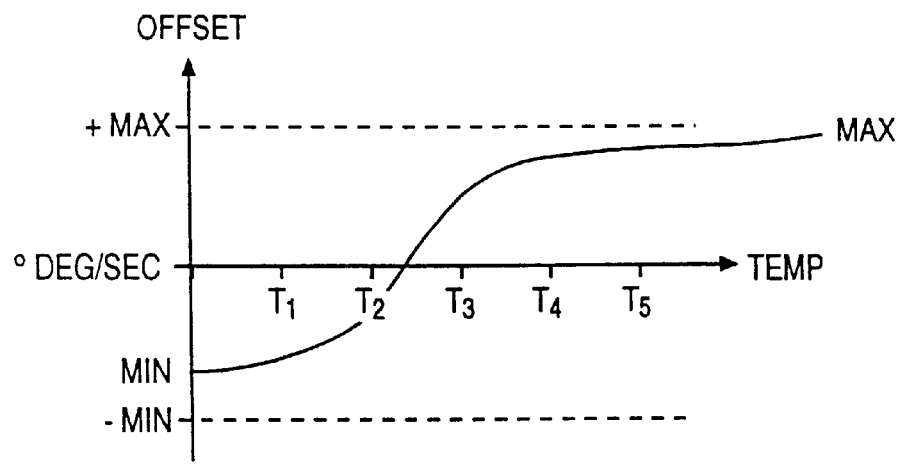
FIG. 3 is a diagram illustrating the possible swing of the offset value over the operating temperature range.

FIG. 3 illustrates the excursion of the zero point offset of a sensor due to the effects of different temperatures T1, T2, T3, T4 and T5. As the temperature moves from a negative temperature to a positive temperature, the offset value may also change.

Figure 5:
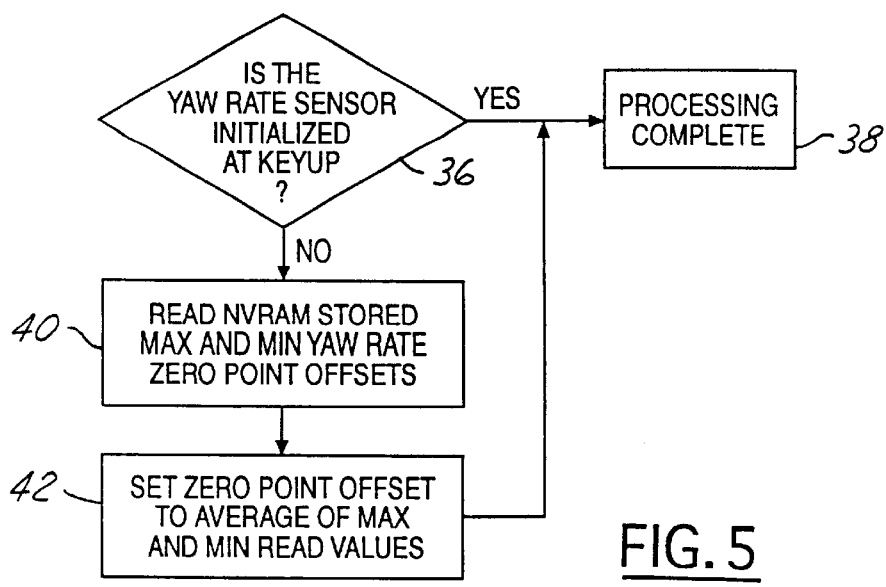
FIG. 5 is a logic flow block diagram in accordance with a preferred embodiment.

FIG. 5 is the algorithm stored in the memory to accomplish the fingerprinting of the sensor and in the first step 36 the yaw rate sensor 28 is tested at ignition on to determine if the sensor has been initialized. After a predetermined time period from ignition on, ΔT, as illustrated in FIG. 2, the control algorithm measures the value of the sensor to determine the actual value of the zero point offset and converts the measured voltage to a digital value. This establishes the reference value of the sensor for the subsequent operation of the control algorithms until the initial conditions, such as the vehicle is not moving and the ignition is turned off. If YES, the algorithm exits to the processing completed, step 38. If NO, then the algorithm proceeds to the step 40 of reading the maximum and minimum yaw rate values from the non-volatile memory. As previously indicated, when the system was first manufactured there was stored in the non-volatile memory of the electronic control unit 24, the values of the maximum and minimum offset values of the sensor.

MAX_YR_ZERO_PT_OFFSET→Stored MAXYR_ZERO_PT_OFFSET

MIN_YR_ZERO_PT_OFFSET→Stored MINYR_ZERO_PT_OFFSET

These values are digitally represented in a manner determined by the control designer. Continuing with FIG. 5, these values are read as shown in the step 40. In the next step 42, the average or mean value of the stored zero point offset is calculated according to the following well-known equation:

YawVelOffset=(MAX_YR_ZERO_PT_OFFSET-MIN_YR_ZERO_PT_OFFSET)/2

YawVelOffset represents a predetermined known beginning point of the zero point-offset value for the sensor.

Figure 6:
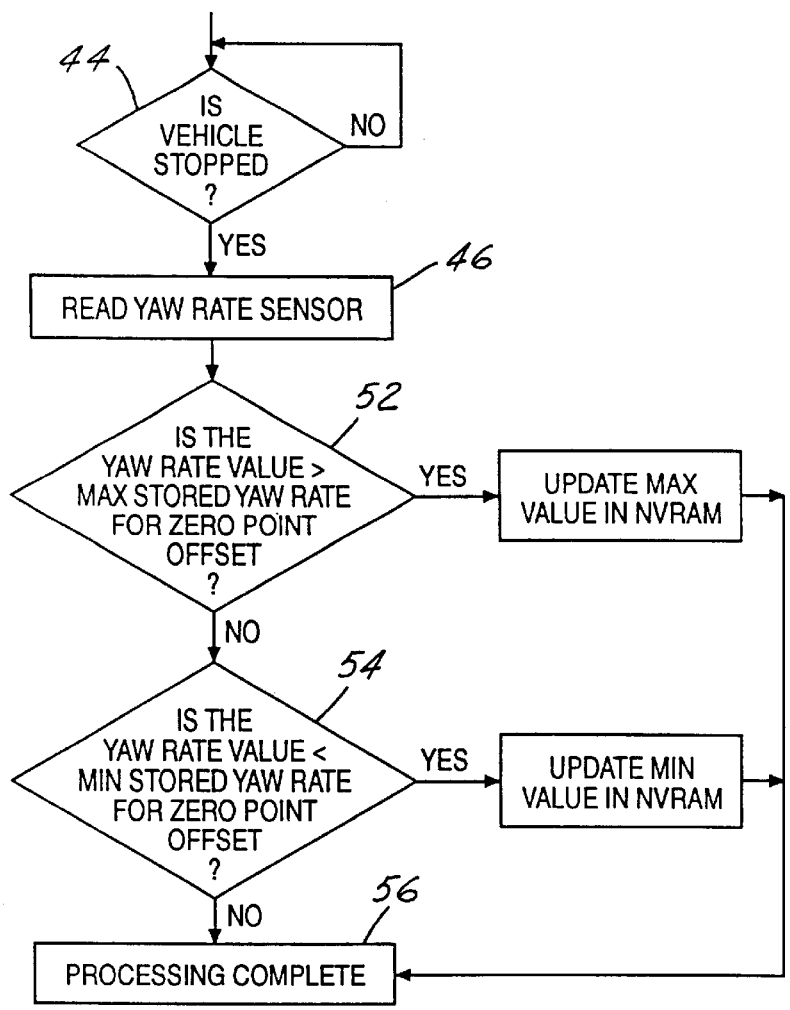
FIG. 6 is a logic flow block diagram in accordance with another aspect of the preferred embodiment.

In FIG. 6, the first step 44 of the algorithm begins with a check to see if the ignition switch is turned on and the vehicle is stopped or not moving.

During operation of the algorithm, when the vehicle is determined to be stopped, the system compares the measured value of the sensor with both the stored maximum and minimum offset values of the sensor, as illustrated in steps 48 and 50. If the measured value lies within the desired spread, no adjustment is made, and the measured value is used by the control system.

However, if the measured value is outside of the maximum or minimum value, the value in question is replaced by the measured value shown in steps 52 and 54. This in effects causes a shift of the band of the zero point offset. Next the absolute difference value or delta between the maximum and minimum offset levels is compared with a predetermined maximum allowable absolute deviation or range or spread.

The absolute value is without regard to and value or sign calculations. If the difference is greater than the allowable deviation or range or spread, the control system makes an adjustment. The value measured replaces the corresponding stored value and the other stored value is adjusted to limit the difference to the predetermined allowable deviation. As an example if the maximum zero point offset is equal to +1deg/sec and the minimum zero point offset is equal to −1deg/sec and the new measured value is −1.2 deg/sec. With the maximum allowable absolute deviation, by design, being equal to 2 degree/second, then the minimum value is replaced with the −1.2 and the maximum value is determined by adding two degree/second to the −1.2 degree/second and the new maximum value is +0.8 degree/second.

The zero point-offset value is then recalculated with the two new values (−1.2 and +0.8). The YawVelOffset now takes on the new value of −0.2 deg/sec at step 42 in FIG. 5.

The two new values are stored in the non-volatile memory and the processing is complete as shown in step 56.

There has thus been shown and described a method of finger printing a sensor. The method defined is for determining the offset value of an electronic sensor such as used in a motor vehicle control system. The present example used is a yaw rate sensor.

What is claimed is:

1. An algorithm stored in a memory for determining the offset value of an electronic sensor such as used in a motor control system comprising the steps of:

storing in the memory, the maximum and minimum offset values of the sensor as determined at the time of manufacture;

calculating the average of the two stored values to derive an offset value for the sensor representing the predetermined known beginning point of the sensor;

applying voltage to the sensor in response to an initialized signal;

waiting for a predetermined time period after the initialized signal;

measuring the output of the sensor for establishing the reference level of the sensor;

comparing the measured value with both the stored maximum and minimum values of the sensor;

replacing one of the stored values in the memory with the measured value if the measured value is greater than the stored value; and then recalculating the average of the two stored values to derive and store in the memory, a new offset value for the sensor.

2. In the algorithm of claim 1 wherein the sensor in a yaw rate sensor.

3. In the algorithm for determining the offset value of an electronic sensor according to claim 1 additionally including the step determining the state of motion of the vehicle prior to the step of applying voltage to the sensor.

4. In the algorithm according to claim 1 additionally including the step of measuring difference between the maximum and minimum stored values of the sensor and comparing the difference to a predetermined spread value.

5. In the algorithm according to claim 4 for storing the last measured value and modifying the other stored value to maintain the difference equal to the predetermined spread value.

6. In the algorithm according to claim 4 for limiting the range of either of the stored values to a predetermined constant multiple from the original values determined at the time of manufacture.

* * * * *